United States Patent
Boggs et al.

[11] 3,717,388
[45] Feb. 20, 1973

[54] SPACER MEANS FOR CUSHIONED TRACK

[75] Inventors: Roger L. Boggs, East Peoria; Robert N. Stedman, Chillicothe, both of Ill.

[73] Assignee: Caterpillar Tractor Co., Peoria, Ill.

[22] Filed: Nov. 20, 1970

[21] Appl. No.: 91,481

[52] U.S. Cl. ................................. 305/19, 152/352
[51] Int. Cl. ......................... B60c 3/00, B60c 13/00
[58] Field of Search ......... 305/19; 152/353, 352, 354

[56] References Cited

UNITED STATES PATENTS

| | | | |
|---|---|---|---|
| 3,601,212 | 8/1971 | Peterson | 305/19 |
| 3,606,921 | 9/1971 | Grawey | 152/354 |
| 3,599,695 | 8/1971 | Knight | 152/352 |
| 2,537,632 | 1/1951 | Mansfield | 152/354 |
| 3,517,720 | 6/1970 | Brown | 152/352 |
| 3,486,547 | 12/1969 | Powers | 152/352 |
| 3,398,776 | 8/1968 | Reinbold | 152/353 |

Primary Examiner—Richard J. Johnson
Attorney—Fryer, Tjensvold, Feix, Phillips & Lempio

[57] ABSTRACT

A resilient spacer means, such as a pneumatic rubber driver, is adapted to have an endless track assembly mounted thereon to form a cushioned track. The spacer means comprises a smooth and uninterrupted annular peripheral portion or tread which intersects with smooth sidewalls thereof to form circumferentially extending square shoulder portions. Each square shoulder portion extends radially inwardly towards the rotational axis of the spacer means to meet with the remaining and relatively thinner respective sidewall portions. The smooth and flat annular peripheral portion of the spacer means assures good sealing and driving contact with the shoes of the track assembly whereas the integrated sidewall and square shoulder construction permits the driver to flex above the articulated link assemblies thereof during operation.

19 Claims, 5 Drawing Figures

INVENTORS
ROGER L. BOGGS
ROBERT N. STEDMAN

BY

ATTORNEYS

SPACER MEANS FOR CUSHIONED TRACK

BACKGROUND OF THE INVENTION

This invention relates to a wheel of the cushioned track type which is particularly adapted for use on earthworking vehicles.

The aggressiveness and efficiency of the cushioned track vehicle, regarding the wide variety of work tasks which can be undertaken therewith, has given rise to the need for novel resilient spacer means therefor. In particular, conventional tires exhibit a number of shortcomings, when employed as spacer means in the integrated cushioned track assembly. For example, such tires tend to slip an undesirable amount, relative to the circumventing track assembly, particularly when the cushioned track is operating over muddy terrain and the like.

The slipping is primarily due to the inability of the tire's tread to form good sealing and driving contact with the flat inner surface portions of the abutting track shoes. In addition, when a conventional tire is subjected to loading, it tends to flatten out as its tread, move the tire's shoulders into engagement with the adjacent link assemblies and to bulge its sidewalls over the link assemblies. The tire is thus subjected to abrasion and to unduly high heat concentrations which tend to cause damage thereto.

SUMMARY AND OBJECTS OF THIS INVENTION

An object of this invention is to overcome the above, briefly described problems by providing an economical spacer or driver means, exhibiting a high degree of structural integrity and a long wear life, which is particularly adapted for use in a cushioned track.

The spacer means comprises opposed, radially extending walls intersecting an annular peripheral portion at circumferentially extending square shoulder portions. The shoulder portions are thick and extend a sufficient distance radially inwardly towards the central rotational axis of the spacer means to normally induce flexing at upper sidewall portions of the spacer means when it is subjected to loading. The spacer means makes smooth and uninterrupted annular surface contact with the track shoes of a surrounding endless track assembly. The track assembly further comprises annular connecting means attached to the shoes to closely couple them together.

BRIEF DESCRIPTION OF THE DRAWINGS

Other objects of this invention will become apparent from the following description and accompanying drawings wherein.

DESCRIPTION OF THE PREFERRED EMBODIMENT

Figure 1:
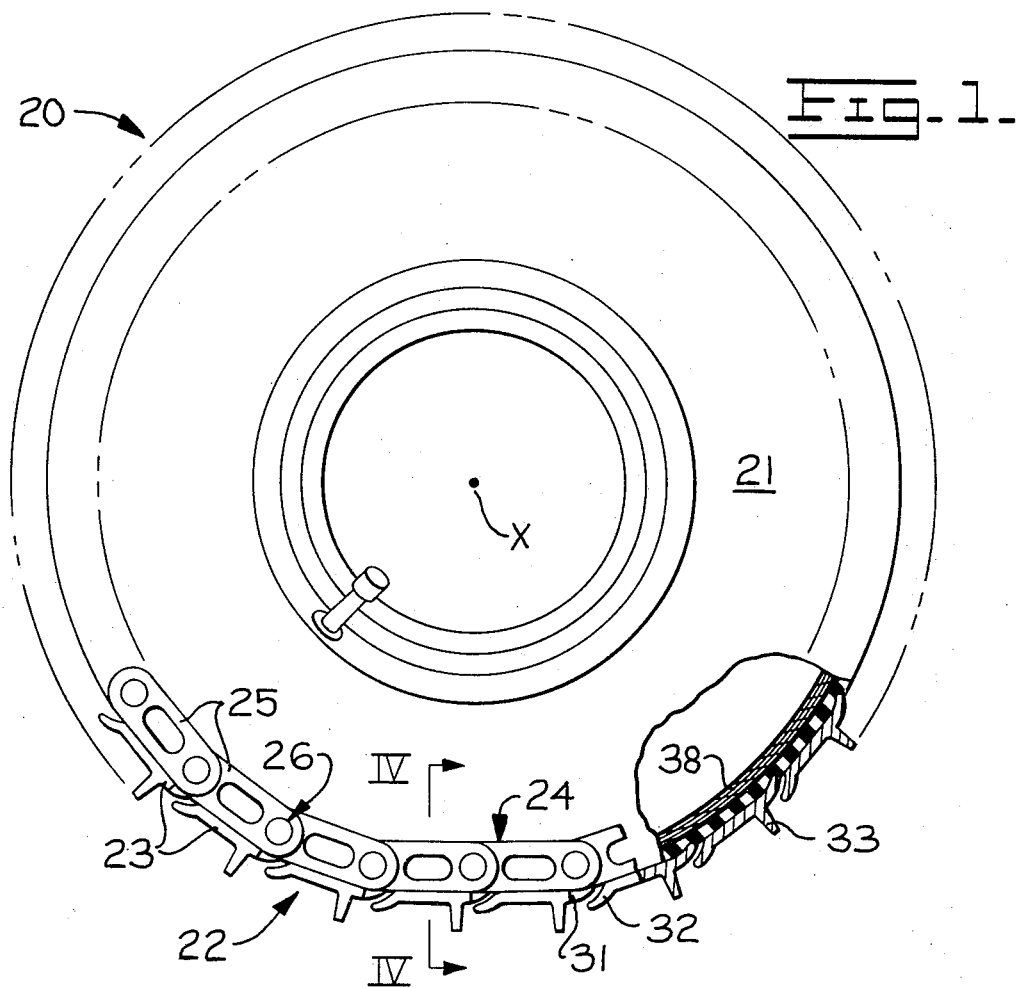
FIG. 1 is a partially sectioned, side elevational view of a cushioned track employing a spacer means embodiment of this invention therein.

FIG. 1 illustrates a cushioned track 20 adapted to replace conventional tires or the like employed on standard earth-working equipment, such as wheel tractor scrapers or loaders. The cushioned track comprises an annular resilient spacer means or driver 21 having a substantially annular and polygonal shaped endless track assembly 22 mounted completely therearound. The resilient spacer means, hereinafter more fully described, preferably comprises an air-inflated rubber driver or tire mounted on a rim assembly.

Figure 4:
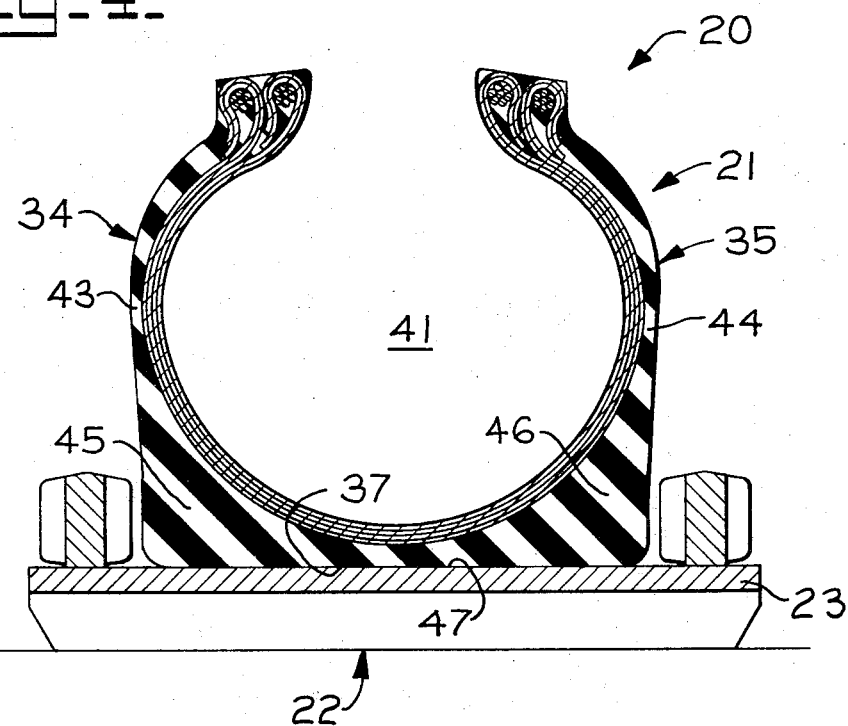
FIG. 4 is an enlarged, cross-sectional view taken in the direction of arrows IV—IV in FIG. 1.

The rim assembly may be suitably connected to a vehicle's drive train (not shown) to be rotated about a central axis X thereof by an internal combustion engine (not shown). The endless track assembly comprises a plurality of closely coupled ground engaging shoes 23 circumferentially surrounding the spacer means. The shoes have widths defining outboard portions (FIG. 4) extending a substantially equal lateral distance beyond a respective wall of the spacer means.

An annular articulated link assembly or connecting means 24 is preferably connected to the outboard portions of the shoes and in slightly spaced relationship relative to a respective wall of the spacer means. The identical link assemblies may be bolted or otherwise suitably connected to the shoes to closely couple them together. The substantially flat and uninterrupted inner surface portions of the shoes (FIGS. 1 and 4) intimately contact and compress a substantial portion of the periphery or tread of the spacer means.

Such periphery assumes a substantially circumferentially continuous and polygonal-shaped configuration for driving purposes. Such driving relationship is fully described in U.S. Pat. application Ser. No. 884,903, filed on Dec. 15, 1969, now U.S. Pat. No. 3,601,212, by Robert A. Peterson et al., for "Cushioned Track and Method for Driving Same," assigned to the assignee of this application.

Figure 3:
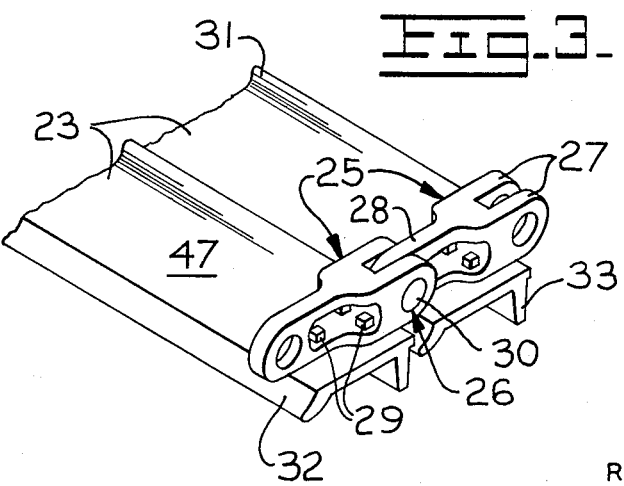
FIG. 3 is an isometric view of a portion of a track assembly employed in the FIG. 1 cushioned track.

FIG. 3 illustrates a portion of the track assembly as comprising an adjacent pair of identical links 25 of each link assembly 24. Each pair of links are connected together for pivotal movement about a common pivot axis by pivot means 26. The illustrated link embodiment is of the fork and blade type comprising a fork end portion 27 positioned to receive a blade end portion 28 of the adjacent link therein.

Each link may be secured to its respective shoe by releasable bolt or securing means 29. The pivot means comprises a pivot pin 30, and preferably a mating bushing (not shown), positioned substantially parallel relative to the central rotational axis X of the cushioned track (FIG. 1) and substantially intermediate a respective pair of adjacent shoes connected together thereby. Such arrangement facilitates a close coupling of the shoes together and also permits the shoes to contact the ground at the formed footprint in a substantially smooth and uninterrupted manner.

In addition, the shoes completely mask the periphery of the spacer means for protection and anti-dirt infiltration purposes. It should be further noted in FIG. 1 and 3 that curved first and second lugs 31 and 32 are preferably formed integrally with each shoe at respective length-wise ends thereof. The completely lugs function in conjunction with the disposition of pin 30 to completely mask each other during rotation of the cushioned track. In particular, first lug 31 of one shoe will substantially overlap the corresponding lug 32 of an adjacent shoe to protect the spacer means against damage and to prevent dirt infiltration during all phases of machine operation.

Although one grouser 33 is illustrated, it should be understood that two or more grousers may be employed on the track shoe if so desired. The grouser extends radially outwardly from the track shoe and fully across the width thereof. The grouser is also preferably positioned closely adjacent to pivot means 26 to induce a smooth transition of the track assembly at the formed footprint during rotation of the cushioned track over the ground.

Figure 2:
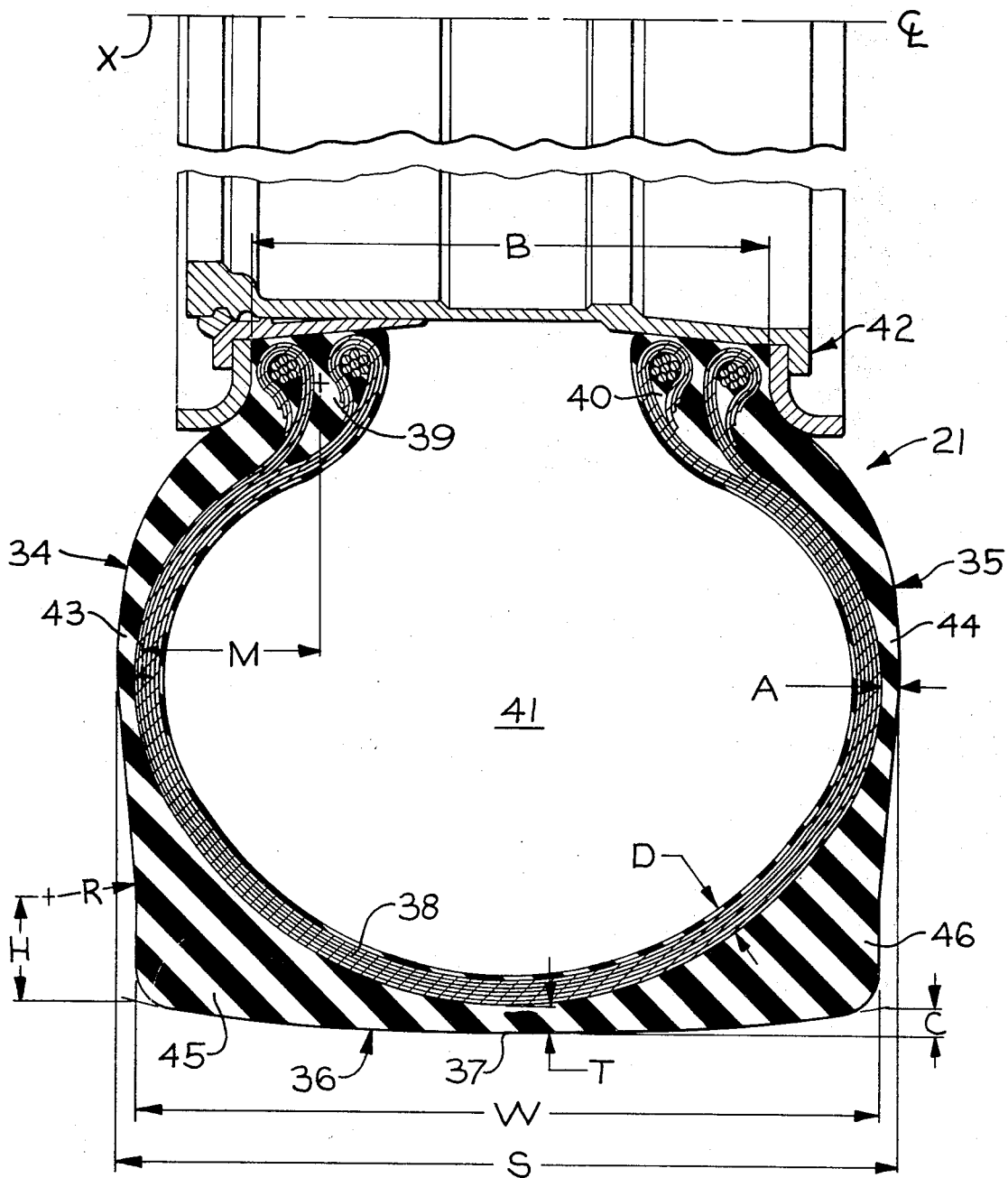
FIG. 2 is an enlarged, cross-sectional view of such spacer means.

FIG. 2 illustrates spacer means 21, composed of a reinforced elastomeric material such as rubber, in a partially inflated condition prior to its application to endless track assembly 22 to form the cushioned track. The spacer means driver embodiment comprises opposed walls 34 and 35 extending generally radially outwardly from the central axis of rotation X thereof. The walls have substantial portions disposed at least approximately perpendicular to such axis and are connected together by an annular peripheral portion 36 disposed generally perpendicular relative thereto.

The peripheral portion 36 has a smooth and uninterrupted annular surface or tread 37 formed thereon. A casing or carcass 38 comprises integrated inner liner, body and reinforcing layers or plies suitably connected at reinforced and flared portions 39 and 40 in a conventional manner. The reinforcing layers may be either of a bias angle or radial construction employing standard fabric material such as rayon, nylon, wire and/or polyester similar to the plies of conventional tires. The number of layers will depend on the particular driver application and will number approximately eighteen to thirty-four for many such applications. For example, a particular biased angle construction employed twenty such layers therein.

Rubber or other suitable elastomer is molded to and suitably combined with carcass layers 38, ending at hoop or bead portions 39 and 40, in a conventional manner. The integrated construction defines a closed toroidal chamber 41, having a generally oval cross-section, with a rim assembly 42, adapted to be air- pressurized to a predetermined level. The driver, when viewed in cross-section, thus exhibits an annular surface 37 which is at least approximately flat, thin intermediate wall portions 43 and 44, a thin section intermediate shoulder portions 45 and 46 and relatively thick shoulder portions.

Although annular peripheral portion 36 is substantially flattened when installed in the cushioned track (FIG. 4), it may assume a slight radius or crown C in the direction of and outwardly from central axis X prior to such installation (FIG. 2). The crown facilitates removal of the driver from a mold during manufacture thereof and mounting of the track assembly on the driver. In addition, the crown assures total contact between the driver and track shoes and aids in compensating for wear occurring in the link assemblies during cushioned track operation.

As suggested above with reference to U.S. Pat. application Ser. No. 884,903, annular surface 37 is compressed by the track assembly to make intimate contact with substantial flat inner surface portions 47 of each track shoe 23. Such compression is primarily occasioned by inflating chamber 41 to the desired air pressure level to form a substantially circumferentially continuous and polygonal-shaped surface contact therebetween which aids in constantly maintaining the desired driving and sealing relationship. The surface contact may be slightly interrupted by up-turned end portions of lugs 31 (FIG. 3) which imbed in the layer of rubber covering the reinforcing layers on the annular periphery, as best shown in FIG. 1.

Square shoulder portions 45 and 46 each comprise a large mass of rubber at the juncture of walls 34 and 35 and peripheral portion 36, exhibiting sufficient stiffness and related physical properties to prevent bulging thereat. Such construction also aids in continuously maintaining intimate contact between annular surface 37 and flat surface portions 47 of the track shoes. When the cushioned track is placed in operation and subjected to increased vertical loading L (FIG. 5), the driver will thus flex in the general vicinity of intermediate wall portions 43 and 44 rather than at the shoulder portions.

A loaded conventional tire, for example, would tend to flatten out at its tread to cause the tire's shoulders to move against the adjacent link assemblies. The sidewalls would also bulge outwardly and over the link assemblies to cause back bending therein. Such movements not only function to abrade the tire, but also generate undue heat concentrations in the tread area. In addition, conventional tires normally require breaker and related plies to strengthen the tread area thereof and generally have deep grooves formed in their treads and shoulders.

In summary, the above-described spacer means or driver when employed in a cushioned track, provides the following desiderata: Efficient sealing is achieved to prevent ingress of mud and like contaminants into the area between the driver and track shoes; Maximum and continuous surface area contact is continuously maintained between the driver and track shoes; Substantially no relative movement occurs between annular surface 37 and the track shoes to virtually eliminate driver wear, abrasion of shoulder 45 and 46, mud pumping between the driver and track shoes and heat build-up in the annular peripheral area; Driver flexing occurs in the general vicinity of intermediate wall portions 43 and 44, above the link assemblies; A low interference fit may be utilized between the driver and track shoes, primarily due to the large area of frictional contact maintained therebetween; A "soft" rubber may be employed in the driver to more readily achieve the above-described polygonal surface contact between the driver and track shoes; The driver may be made lighter and more economically than conventional tires due to the elimination of various, unneeded plies and a substantial amount of rubber; and the driver can be readily and expeditiously molded while yet maintaining reasonable tolerances thereon.

FIG. 2 further illustrates some dimensional design parameters, pertaining to the desiderata set forth above, which have the following definitions:

A = Thickness of elastomeric material over reinforcing layers in vicinity of intermediate wall 44.
B = Rim width.
C = Maximum crown clearance.
D = Thickness of carcass reinforcing layers 38.
H = Height of center of radium R, above the track shoe.
M = Movement arm between centroids of driver hoop portion 39 and wall 34.
R = Radius tangentially blending wall 34 with shoulder 45
S = Section width
T = Minimum thickness of elastomeric section intermediate shoulders 45 and 46
W = Width of annular peripheral portion 37.

Figure 5:
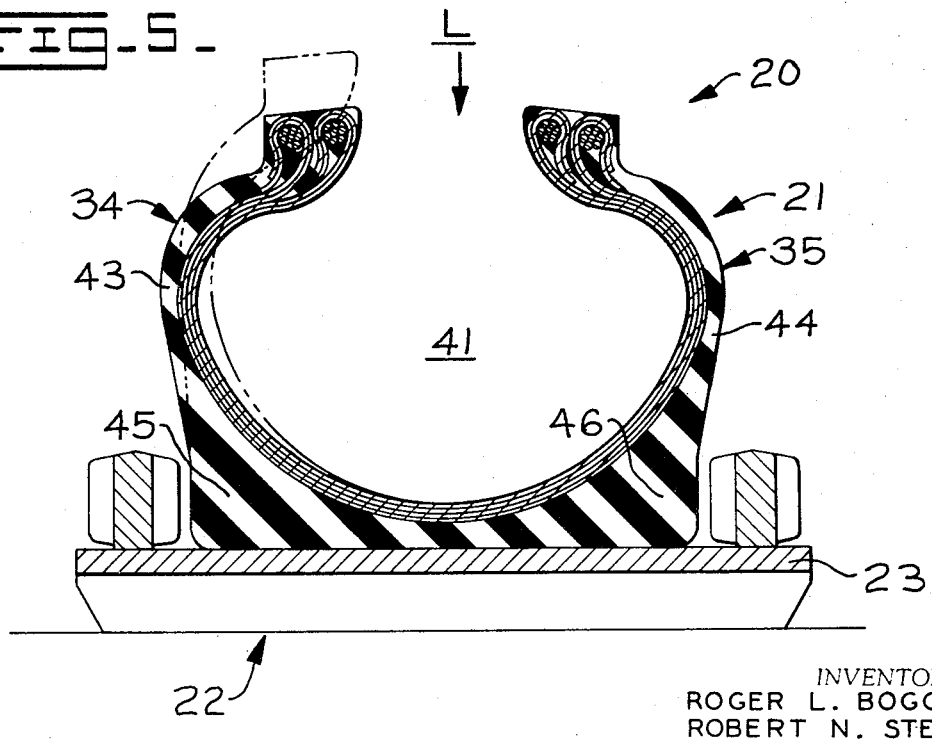
FIG. 5 is a view similar to FIG. 4, but showing the cushioned track as it would appear in operation with an increased vertical load L imposed thereon.

Intermediate wall portions 43 and 44 are covered with a protective layer of elastomeric material, disposed outside the reinforcing layers having relatively thin minimum thicknesses A, primarily formed to induce flexing in the vicinity thereof and above link assemblies 24 (FIG. 5). The smooth and substantially uninterrupted outer surface portions of the driver's walls and annular peripheral portion are free of interrupting ribs or bars which would tend to restrict such flexing and otherwise interfere with the desired cushioned track functions. Carcass 38 has a substantially constant composite thickness D throughout the length thereof to further aid in achieving the desired operation and to facilitate fabrication.

Crown clearance C is designed to provide a constant pressure gradient against the shoes across the width of the annular peripheral portion. The pressure gradient is established by a combination of the air pressure inside the driver and the section stiffness of the annular peripheral portion. Thus as the annular peripheral portion reduces in stiffness from the solid shoulder portions to the thinner intermediate portion therebetween the reduction in force will be offset by the greater effective force from the air pressure in the thinner section. Maximum crown clearance C will vary depending on the particular cushioned track application and the size of the driver. For example, a 21 × 29 inch driver had a maximum crown clearance closely approximating ¾ inch.

Wall 34 preferably has outer surface portions formed thereon, defined by a radius R, to tangentially blend the wall with shoulder 45. The center of such radius is shown as positioned at a height H preferably approximating the radial height of each link 25. Such construction will further aid in inducing flexing of the walls at intermediate wall portions 43 and 44 and above the links.

Each shoulder portion has substantially flat and annular outer surface portions of approximately height H positioned in substantial parallel relationship with respect to an adjacent link assembly. The thickness T of the rubber section intermediate shoulders 45 and 46 has a range depending on the driver application. The minimum thickness when used with track shoes having a smooth, uninterrupted surface 47 is approximately that of A to provide a protective cover for the reinforcing layers of the carcass of a thickness to facilitate manufacture and provide sufficient rubber in the shoulders to stiffen them. The maximum thickness is determined by two criteria. (1) The rubber should be of sufficient thickness to provide adequate carcass protection when moving the machine with the track assembly removed such as moving in the shop or from one job site to another down a paved highway. (2) Of greater importance, the maximum rubber thickness T is approximately equal to two times the depth of penetration of the lugs 31 when they are turned in as shown in FIGS. 1 and 3 as a deterent to slippage between the driver and track assembly. The ratio will vary in accordance with the carcass stiffness, but should be sufficient to allow displacement of the rubber to at least substantially absorb the upturned lug without damage to the carcass. Normally the minimum thickness T of the elastomer material disposed outside the reinforcing layers intermediate shoulders 45 and 46 is approximately equal to or greater than thickness A and at least sufficient to envelope upturned portions of lugs 31 and to prevent damage to carcass 38 (FIG. 1). For example, a 21 × 29 inch driver (with 20 ply rating) had a thickness of 1 inch when used with upturned lugs of approximately ½ inch in height.

Tread width W should be sufficiently wide to aid in inducing the driver to flex in the vicinity of wall portions 43 and 44 and not at annular portion 36, including shoulders 45 and 46. Such dimension is dependently variable with respect to rim width B and driver section width S. In particular, annular peripheral portion width W normally should be greater than rim width B, but equal to or less than section width S. Such a narrow based driver is readily adapted for cushioned track applications due to the inherently created and substantial moment arm M, between the centroids of the driver hoop and wall, causing flexing to occur between them in a definite controlled manner.

What is claimed is:
1. A cushioned track comprising
an annular resilient spacer means, composed of a reinforced elastomeric material, mounted for rotation about a central axis thereof, and
an endless track assembly circumferentially mounted completely around said spacer means, said track assembly comprising
a plurality of closely coupled ground-engaging shoes circumferentially surrounding said spacer means and
annular connecting means connected to said shoes to closely couple them together,
said spacer means comprising
opposed walls each having a reinforced hoop portion and extending therefrom generally axially and radially outwardly relative to said hoop portions and
an annular peripheral portion, having a substantially smooth and uninterrupted annular surface mounting said track assembly thereon, extending generally perpendicular relative to said walls to intersect therewith to form a circumferentially extending square shoulder portion at each side of said spacer means, the axial width of said peripheral portion substantially equalling the axial width of the widest portion of said spacer means,
said walls and peripheral portion defining a toroidal chamber in said spacer means having a generally oval cross section, said spacer means, when viewed in cross section, including said peripheral portion which is substantially flat, and square shoulder portions which are substantially thicker than intermediate wall portions which extend radially inwardly towards said central axis from a respective one of said shoulder portions, each of said hoop portions positioned substantially axially inwardly relative to a respective one of said wall portions, each of said connecting means being positioned radially outwardly of said intermediate wall portions and adjacent to said shoulder portions whereby when said cushioned track is subjected to a load imposed vertically downwardly relative to said central axis flexing of the walls is confined to portions located radially inwardly of said annular connecting means including the intermediate wall portions.

2. The invention of claim 1 wherein all of the outer surface portions of said opposed walls, shoulder portions and annular surface are substantially smooth and uninterrupted.

3. The invention of claim 1 wherein said annular peripheral portion is normally crowned in the direction of and outwardly from said central axis when relaxed and is substantially flattened by said shoes.

4. The invention of claim 1 wherein each of said shoulder portions has substantially flat and annular outer surface portions positioned adjacent and parallel to a respective link assembly.

5. The invention of claim 1 wherein said connecting means comprises a connecting means positioned on each side of said spacer means, adjacent to a respective shoulder portion, and attached to radially inner surface portions of said shoes, each of said connecting means comprising an articulated link assembly, each link assembly comprising a plurality of links and pivot means, comprising a pivot pin positioned substantially parallel relative to said central axis and intermediate each pair of adjacent shoes, pivotally connecting each circumferentially adjacent pair of links together.

6. The invention of claim 5 wherein each of said link assemblies comprises a plurality of single links with each circumferentially adjacent pair of links being overlapped and connected together by said pivot pin, one of said links attached to each one of said shoes, each of said links comprising a fork end portion and an opposite blade end portion, the blade end portion of one link of each adjacent pair of links being pivotally mounted within the fork end portion of the second link thereof.

7. The invention of claim 5 further comprising curved and complementary lug means formed on each length-wise end of each shoe to be at least substantially parallel with respect to the longitudinal axis of said pins and positioned thereon to continuously and completely overlap a lug means of an adjacent shoe whereby the entire annular surface of said spacer means is completely masked during rotation thereof.

8. The invention of claim 5 wherein said shoes have widths defining outboard portions extending a substantially equal lateral distance beyond a respective one of said shoulder portions, each of said connecting means attached to a respective one of said shoe's outboard portions in spaced relationship relative to a respective one of said shoulder portions of said spacer means.

9. The invention of claim 5 wherein substantial inner surface portions of each of said shoes are flat, and substantial portions of the annular surface of said spacer means are maintained solely in compressed intimate contact therewith to form substantially circumferentially continuous and polygonal-shaped surface contact therebetween.

10. The invention of claim 1 wherein said spacer means comprises an air-inflated elastomeric member having reinforcing layers integrated therein.

11. The invention of claim 10 wherein the thickness of the elastomeric material disposed outside the reinforcing layers at an intermediate portion of said annular peripheral portion between said shoulder portions, when viewed in cross-section, is approximately equal to or greater than the minimum thickness of the elastomeric material disposed outside the reinforcing layers of each of said intermediate wall portions.

12. The invention of claim 10 wherein said reinforcing layers have a substantially constant composite thickness throughout the length thereof, when viewed in cross-section, said layers terminating at each end thereof at an annular reinforced hoop portion of said spacer means.

13. The invention of claim 12 wherein the centroid of each hoop portion is located inwardly from the centroid of a respective wall producing a moment equal to approximately one-fourth of the section width of said spacer means.

14. A driver, composed of a reinforced elastomer, disposed for rotation about a central axis thereof and adapted for use in a cushioned track comprising opposed walls each having a reinforced hoop portion and extending therefrom generally axially and radially outwardly relative to said hoop portions and an annular peripheral portion extending generally perpendicular relative to said walls to intersect therewith to form a circumferentially extending square shoulder portion at each side of said driver, the axial width of said peripheral portion substantially equalling the axial width of the widest portion of said spacer means, the outer surface portions of said walls and an annular surface of said annular peripheral portion being substantially smooth and uninterrupted, said walls and peripheral portion defining a toroidal chamber in said driver means having a generally oval cross section, said driver, when viewed in cross section, including an annular surface which is substantially flat, and square shoulder portions which are substantially thicker than intermediate wall portions which extend radially inwardly towards said central axis from a respective one of said shoulder portions and merge therewith at a slightly concave outer surface which terminates at approximately one-half of the radial height of said driver, each of said hoop portions positioned substantially axially inwardly relative to a respective one of said wall portions whereby when said driver is subjected to a load imposed vertically downwardly relative to said central axis said driver will flex primarily in the radially inner portions of said intermediate wall portions.

15. The invention of claim 14 wherein the minimum thickness of an intermediate portion of said annular peripheral portion between said shoulder portions, when viewed in cross-section, is approximately equal to the minimum thickness of each of said intermediate sidewall portions.

16. The invention of claim 14 wherein said annular peripheral portion is crowned in the direction of and outwardly from said central axis.

17. The invention of claim 14 wherein each of said shoulder portions has substantially flat and annular outer surface portions positioned perpendicular relative to said central axis and further positioned at the radial outward extremity of a respective one of said opposed walls.

18. The invention of claim 14 wherein said driver has reinforcing layers integrated therein, said reinforcing layers have a substantially constant composite thickness throughout the length thereof, when viewed in cross-section, and terminating at each end thereof at an annular reinforced hoop portion of said driver.

19. The invention of claim 18 wherein an imaginary moment arm disposed parallel relative to said central axis and between the centroids of each hoop portion and a respective wall approximates one-fourth of the section width of said driver means.

* * * * *